Patented Sept. 30, 1930

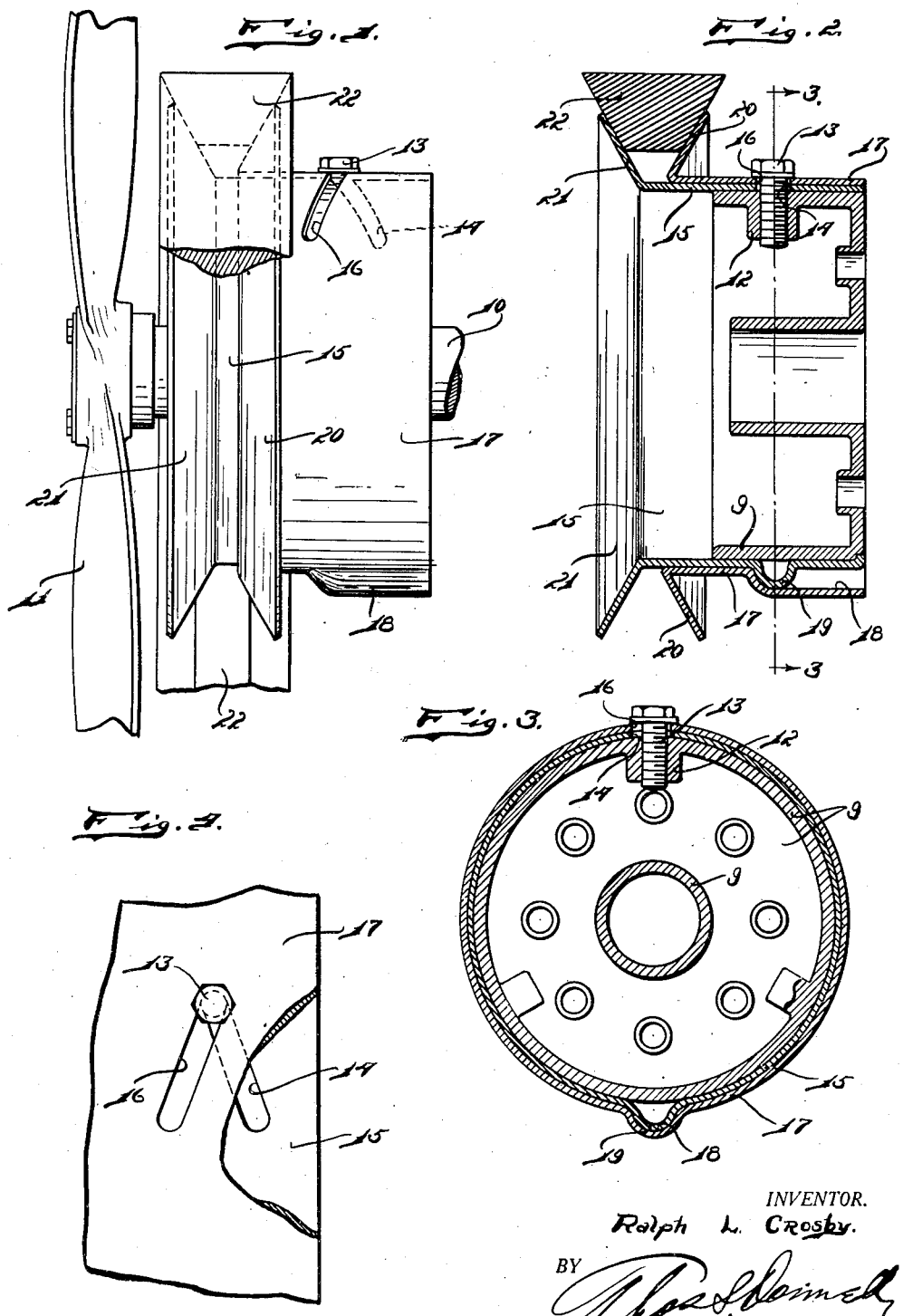

1,776,996

UNITED STATES PATENT OFFICE

RALPH L. CROSBY, OF HIGHLAND PARK, MICHIGAN

BELT ADJUSTER

Application filed October 25, 1928. Serial No. 314,864.

My invention relates to a new and useful improvement in a belt adjuster and is illustrated in the drawings as applied to a fan belt for driving the cooling fan of an internal combustion engine. From the description, however, it will appear evident that the invention is adapted for use as a belt adjuster on various types of mechanism.

It is an object of the present invention to provide a belt adjuster having a pair of belt engaging parts, relative movement of which will effect adjustment of the belt.

Another object of the invention is the provision of a pair of groove-forming, relatively movable members for engaging the belt, relative movement of which will effect adjustment of the tautness of the belt.

Another object of the invention is the provision of a pair of relatively movable belt engaging members, each provided with an inclined slot directed oppositely to the incline in the other and arranged for relative movement upon unitary rotation.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention applied, with parts broken away.

Fig. 2 is a central vertical sectional view of the invention.

Fig. 3 is a sectional view taken on line 3—3 of Fig. 2.

Fig. 4 is a fragmentary side elevational view of the invention.

The invention as illustrated in the drawings is adapted for use with a hub 9 which is adapted for mounting upon a shaft 10 upon which the fan 11 is fixedly mounted. Projecting inwardly of the hub 9 is a threaded boss 12 into which is threaded a set screw 13 projected through an elongated slot 14 formed in the cylindrical member 15 and projected through the elongated slot 16 formed in the cylindrical member 17. The cylindrical member 17 embraces the cylindrical member 15 and is provided with an outwardly pressed portion to provide a channel 18 in which the outwardly pressed boss 19 on the member 15 engages. Formed on the end of the member 17 is an inclined flange 20 which is inclined in the opposite direction to the flange 21 which is formed on the end of the member 15; a wedge-shaped belt 22 serves to drive the hub 9 and engages the inner faces of the flanges 20 and 21.

The engagement of the boss 19 in the passage 18 will prevent relative rotation of the cylindrical members 15 and 17 but will not prevent relative axial movement of these members. If these members are rotated in unison on the hub 9, the engagement of the screw 13 in the slots 14 and 16 will effect relative axial movement of the members 15 and 17 so as to cause the flanges 20 and 21 to approach or withdraw depending upon the direction of rotation. As these flanges withdraw, it is evident that the belt will thereby be loosened as it will be permitted to set more deeply in the channel between the flanges 20 and 21. A relative approach of the flanges 20 and 21 will effect the reverse operation. Consequently, the flanges 20 and 21 together form a pulley over which the belt 22 rides.

By moving both of the flanges 20 and 21, a centering of the pulley is always provided so that it will cause a minimum amount of wear on the belt 22.

While I have illustrated and described the preferred form of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A belt adjuster of the class described, comprising: a pair of telescoping sleeves, each having an elongated slot formed therein, said slots being inclined oppositely to each other and crossing; a hub for supporting said sleeves; a set screw threaded into said hub and projected through said slots; and a flange on one end of each of said sleeves, said flanges being normally in spaced relation and forming a pulley.

2. A belt adjuster of the class described, comprising: a pair of telescoping sleeves, each having an elongated slot formed therein, said slots being inclined oppositely to each other and crossing; a hub for supporting said sleeves; a set screw threaded into said hub and projected through said slots; and a flange on one end of each of said sleeves, said flanges being normally in spaced relation and forming a V-type pulley, the rotation of said sleeves on said hub effecting relative movement of said flanges.

In testimony whereof I have signed the foregoing specification.

RALPH L. CROSBY.